(12) United States Patent
Aizawa et al.

(10) Patent No.: US 6,225,772 B1
(45) Date of Patent: *May 1, 2001

(54) ACCELERATION/DECELERATION CONTROL METHOD FOR NUMERICAL CONTROL, AND NUMERICAL CONTROL DEVICE

(75) Inventors: Nobuaki Aizawa; Hidehiro Miyajima, both of Minamitsuru-gun (JP)

(73) Assignee: Fanuc Ltd., Yamanashi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,743

(22) Filed: Nov. 9, 1998

(30) Foreign Application Priority Data

Nov. 7, 1997 (JP) .................................................. 9-320598

(51) Int. Cl.[7] ...................................................... G05B 19/25
(52) U.S. Cl. ............................ 318/571; 318/600; 700/188
(58) Field of Search .......................... 318/568.1–568.11, 318/569–572, 600, 601, 603; 700/159, 160, 186, 188

(56) References Cited

U.S. PATENT DOCUMENTS

| | | | |
|---|---|---|---|
| 4,020,331 | * 4/1977 | Kimura et al. | 318/571 |
| 4,278,872 | 7/1981 | Koether et al. | |
| 4,600,985 | 7/1986 | Nozawa et al. | 318/571 |
| 4,652,804 | 3/1987 | Kawamura et al. | 318/590 |
| 4,949,444 | * 8/1990 | Kojima et al. | 82/120 |
| 4,994,978 | * 2/1991 | Kawamura et al. | 318/561 |
| 5,132,912 | * 7/1992 | Ito et al. | 318/571 |
| 5,371,451 | * 12/1994 | Toyasawa et al. | 318/568.11 |
| 5,761,376 | * 6/1998 | Gering | 388/844 |
| 5,811,952 | 9/1998 | Kato et al. | 318/568.11 |
| 5,827,020 | * 10/1998 | Fujita et al. | 409/80 |
| 5,911,125 | 6/1999 | Fujibayashi et al. | 318/568 |

FOREIGN PATENT DOCUMENTS

| | | |
|---|---|---|
| 0779566 A1 | 6/1997 | (EP). |
| 0788042 A1 | 8/1997 | (EP). |
| 52-034183 | 3/1977 | (JP). |
| 51-024661 | 9/1977 | (JP). |
| 60-089201 | 5/1985 | (JP). |
| 62-090705 | 4/1987 | (JP). |
| 1-271145 | 10/1989 | (JP). |
| 5-127732 | 5/1993 | (JP). |
| 8-057748 | 3/1996 | (JP). |

* cited by examiner

Primary Examiner—David Martin
(74) Attorney, Agent, or Firm—Staas & Halsey LLP (57) ABSTRACT

Tool feed speed Fa (mm/min) is calculated for each tool feed step on the basis of a tool feed speed F (mm/rev) specified in advance and the actual rotational speed Sact of the spindle (rev/min). The tool feed speed Fa (mm/min) and the tool feed speed Fold of the previous cycle (initially, a value based on the maximum rotational speed S of the spindle as a tentative feed speed Fold) are compared, and if a change has been detected, a tool feed speed Fb (mm/min) for the subsequent tool feed step is calculated based on the relation between the tool feed speed Fc (mm/min) based on the subsequent maximum rotational speed S of the spindle (rev/min), the maximum rotational speed S of the spindle (rev/min), and the rotational speed Sact of the spindle (rev/min); and the tool feed speed undergoes pre-interpolation acceleration/deceleration control on the basis of the subsequent tool feed speed Fb (mm/min) and the tool feed speed Fa (mm/min).

3 Claims, 5 Drawing Sheets

ACCELERATION/DECELERATION CONTROL METHOD FOR NUMERICAL CONTROL, AND NUMERICAL CONTROL DEVICE

BACKGROUND OF THE INVENTION

1. Field of the Invention

The present invention relates to an improvement for a numerical control device and an acceleration/deceleration control method for numerical control.

2. Description of the Related Art

Pre-interpolation acceleration/deceleration control and post-interpolation acceleration/deceleration control are known in cases in which tool feed speeds are accelerated or decelerated during transition from the currently executed tool feed step to the subsequent tool feed step on the basis of a tool feed speed specified in advance for each tool feed step by means of tool feed speed values (expressed, for example, in mm/min units), which are given by the amount of movement (tool feed distance) to be made per unit time.

However, in turning, tapping and other type of machining, tool feed rate (for example, mm/rev) for each tool feed step, which is commanded in terms of feed distance per a single rotation of or unit angle of the spindle (hereinafter referred to as an amount of movement per unit angle of the spindle) and rotational speed of the spindle (for example, rev/mm), which substantially represents an angular speed of the spindle, are specified so that the tool is fed according to the rotational speed of the spindle. Consequently, a tool feed speed (for example, in mm/min) expressed as the amount of movement per unit time cannot be provided as part of machining data in a program. As a result, the aforementioned pre-interpolation acceleration/deceleration control based on the tool feed speed expressed as the amount of movement per unit time cannot be applied to turning, tapping, or other types of machining.

In some conventional numerical control devices, the tool feed speed (for example, in mm/min), expressed as the amount of movement per unit time at each tool feed step, is calculated on the basis of the tool feed rate (for example, in mm/rev) at each tool feed step, expressed as the amount of movement per unit rotation angle of the spindle, and on the basis of the current value (for example, in rev/min) of the rotational speed, substantially expressed as the angular speed of the spindle; and this tool feed speed is used for carrying out the post-interpolation acceleration/deceleration control of the tool feed speed at the currently executed tool feed step, which is expressed as the amount of movement per unit time.

However, according to such post-interpolation acceleration/deceleration control, acceleration/deceleration control is carried out after interpolation, thus creating shape errors in the work.

OBJECTS AND SUMMARY OF THE INVENTION

It is an object of the present invention to prevent the above-described drawbacks of prior art and to provide a pre-interpolation acceleration/deceleration control method and a numerical control device capable of performing precision machining without creating shape errors in the work even when the rotation angle of the spindle varies in cases in which tools are caused to feed in a manner dependent on the rotational speed of the spindle, as in turning, tapping, or the like.

In the present invention, the numerical control device for controlling a tool feed speed on the basis of a tool feed speed expressed as the amount of tool movement per unit rotation angle of the spindle comprises means for sensing the actual feed speed of the spindle; command conversion means for achieving conversion to a tool feed speed, expressed as the amount of movement per unit time, on the basis of an instructed tool feed speed and the actual rotation angle of the spindle sensed by the aforementioned sensing means, and obtaining a speed command for a tool; and means for performing pre-interpolation acceleration/deceleration control on the basis of the current tool feed speed converted by said conversion means and expressed as the amount of movement per unit time, and a subsequent tool feed speed expressed as the amount of movement per unit time, wherein performing of pre-interpolation acceleration/deceleration control on the basis of the tool feed speed which was converted to the amount of movement per unit time allows pre-interpolation acceleration/deceleration control to be performed even in execution of a machining program in which the tool feed speed is defined as the amount of movement per unit rotation angle of the spindle.

According to the present invention, even when a tool feed rate for each tool feed step is commanded in terms of the amount of movement per unit rotation angle of the spindle, a tool feed speed for each tool feed step, which is expressed as the amount of movement per unit time, is automatically calculated based on the actual rotational speed of the spindle, and a tool feed speed expressed as the amount of movement per unit time, which is to be designated for the subsequent tool feed step, is also calculated in advance on the basis of the actual rotational speed of the spindle, thereby making it possible to adequately implement pre-interpolation acceleration/deceleration control of tool feed and to effectively prevent shape errors from developing during cutting even when the rotation angle of the spindle varies in cases in which tools are caused to feed in a manner dependent on the rotational speed of the spindle, as in turning, tapping, or the like.

BRIEF DESCRIPTION OF THE DRAWINGS

The foregoing and other objects and features of the invention will become apparent from the following description of preferred embodiments of the invention with respect to the accompanying drawings, in which.

DESCRIPTION OF THE PREFERRED EMBODIMENTS

Figure 1:
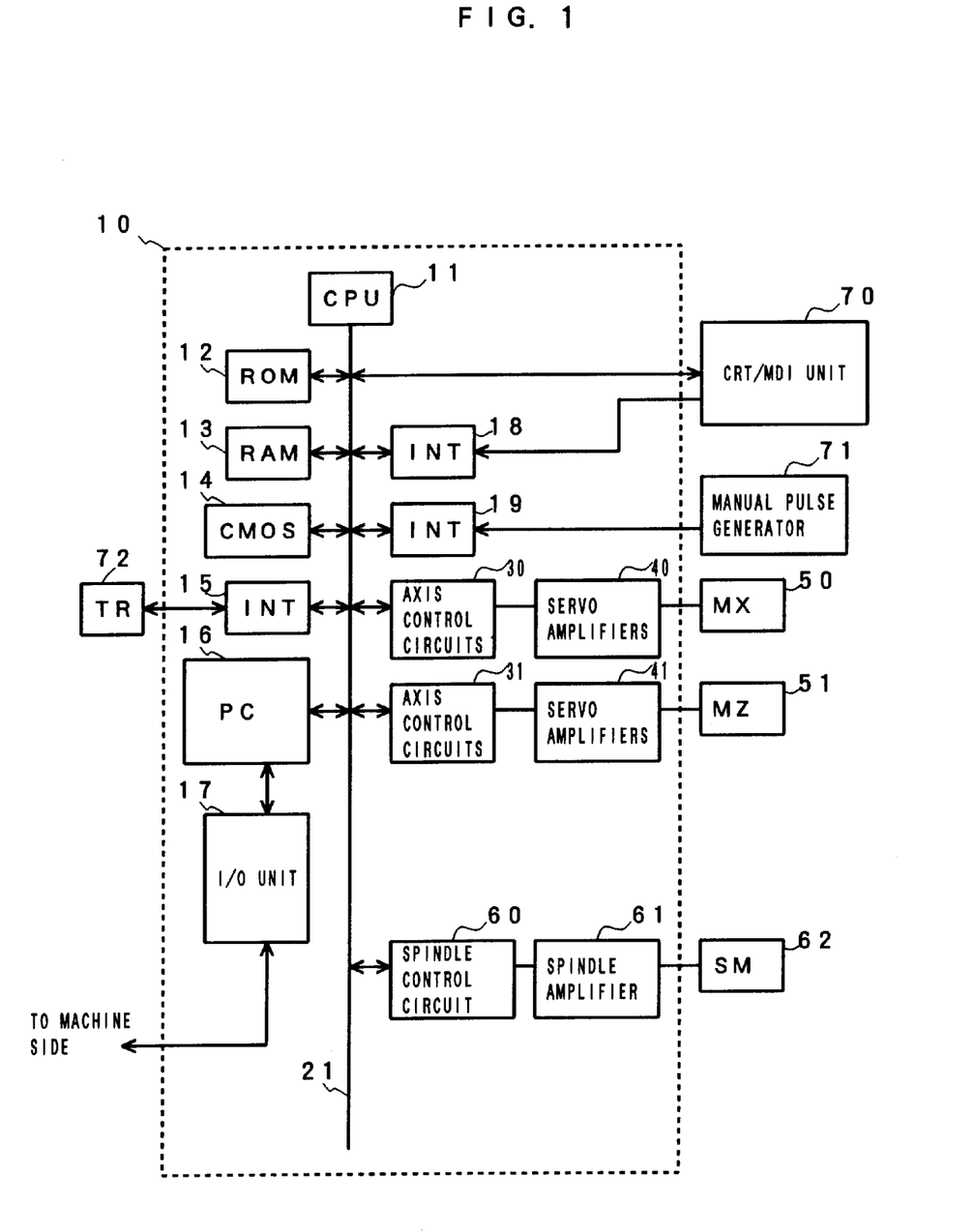
FIG. 1 is a functional block diagram depicting one embodiment of a numerical control device to which the pre-interpolation acceleration/deceleration control method of the present invention is applied, and a machine tool driven in a controlled manner by this numerical control device.

The numerical control device of an embodiment to which the acceleration/deceleration control method of the present invention is applied, and a machine tool (for example, a lathe) driven in a controlled manner by this numerical control device will be described using the functional block diagram in FIG. 1.

A processor 11, which is a device for controlling the overall operation of a numerical control device 10, reads the system program stored in a ROM 12 via a bus 21, and controls the overall operation of the numerical control device 10. Temporary computational data, display data, and the like are stored in a RAM 13. A CMOS memory 14 is configured as nonvolatile memory backed up by a battery (not shown) and designed such that the stored state is preserved even when no power is supplied to the numerical control device 10.

An interface 15 is designed for outside equipment and is connected to a paper tape reader, paper tape puncher, or other piece of outside equipment 72. Machining data can be read from the paper tape reader, and a machining program edited by the numerical control device 10 can be outputted to the paper tape puncher.

A programmable controller 16 controls a machine tool according to sequence programs stored in the numerical control device 10. Specifically, these sequence programs convert data to necessary signals on the machine tool side in accordance with the functions commanded by the machining program, and the results are outputted from an I/O unit 17 to the machine tool side. Various actuators on the machine tool side are actuated by these output signals. In addition, signals are also received and the necessary processing is performed for the limit switches on the machine tool side, for the various switches on the machine control panel, and the like, and the results are transmitted to the processor 11.

Current axis positions, alarms, parameters and other video signals such as video data are sent to the display devices of an CRT/MDI unit 70 and displayed on a display device. An interface 18 receives data from the keyboard of the CRT/MDI unit 70 and transmits these data to the processor 11. An interface 19 is connected to a manual pulse generator 71 and receives pulses from the manual pulse generator 71. The manual pulse generator 71 is mounted on the machine control panel on the machine tool side and is used for the accurate positioning of movable machine parts by hand.

Axis control circuits 30 and 31 receive axial movement commands from the processor 11 and send these axis-related commands to servo amplifiers 40 and 41. The servo amplifiers 40 and 41 receive these commands and actuate servomotors 50 and 51 for the axes. Pulse encoders for sensing positions and speeds are built into the servomotors 50 and 51 of the X and Z axes, and feedback signals from these pulse encoders are fed back to the axis control circuits 30 and 31. Each of the servo control processors built into the axis control circuits 30 and 31 performs processing routines for position loops, speed loops, and electric current loops on the basis of these feedback signals and the aforementioned movement commands; the torque commands for the final drive and control are calculated for each axis; and the positions and speeds of the servomotors 50 and 51 for these axes are controlled.

A spindle control circuit 60 receives spindle rotation commands, spindle orientation, and other commands, and outputs spindle speed signals to a spindle amplifier 61. The spindle amplifier 61 receives these spindle speed signals and rotates a spindle motor 62 at the commanded rotational speed. In addition, the spindle motor 62 is set at a commanded position of rotation by an orientation command.

Figure 2:
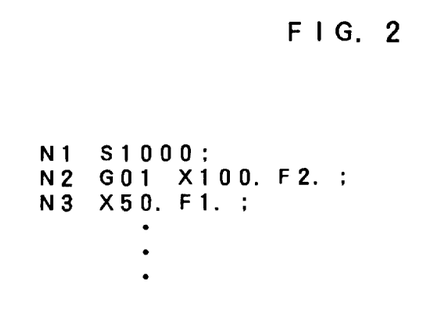
FIG. 2 is a program list depicting an example of a machining program for turning.

FIG. 2 is part of a program list depicting an example of a machining program for turning. In block N1, "S" is a command for specifying the rotational speed of the spindle, and "1000" is the command value. The command for the rotational speed of the spindle may be commanded by means of a program, or it may be set manually with an MDI or the like. In this embodiment, the rotational speed of the spindle is expressed in rev/min (that is, in revolutions per minute), but other units may also be employed as long as they can be used to substantially express the angular speed of the spindle.

"G01" in block N2 is a modally functioning linear interpolation command, and the amount of movement is specified by the subsequently following incremental command for each axis. Because "X100" is specified in this example, the command prescribes linear interpolations of 100 mm from the current tool position in the positive direction of the X-axis. In addition, the "F" in block N2 is a command for specifying the feed rate of a tool as the amount of movement per unit rotation angle of the spindle, and is given in this embodiment in mm/rev (that is, in millimeters per revolution of the spindle). Because the command value in the example in FIG. 2 is "2.", the resulting command causes the tool to feed at a rate of 2 mm/rev in a manner dependent on the rotation of the spindle. The direction and amount of feed of the tool are already defined by "G01×100." in the same block.

Because "G01" is a modally functioning linear interpolation signal, it can be applied directly to block N3 as well. Specifically, in block N3 linear interpolations corresponding to 50 mm are further performed from the end point of block N2 in the positive direction of the X-axis. Because "1." is specified by the F command in block N3, the tool is caused to feed at a rate of 1 mm/rev in a manner dependent on the rotation of the spindle.

Figure 4:
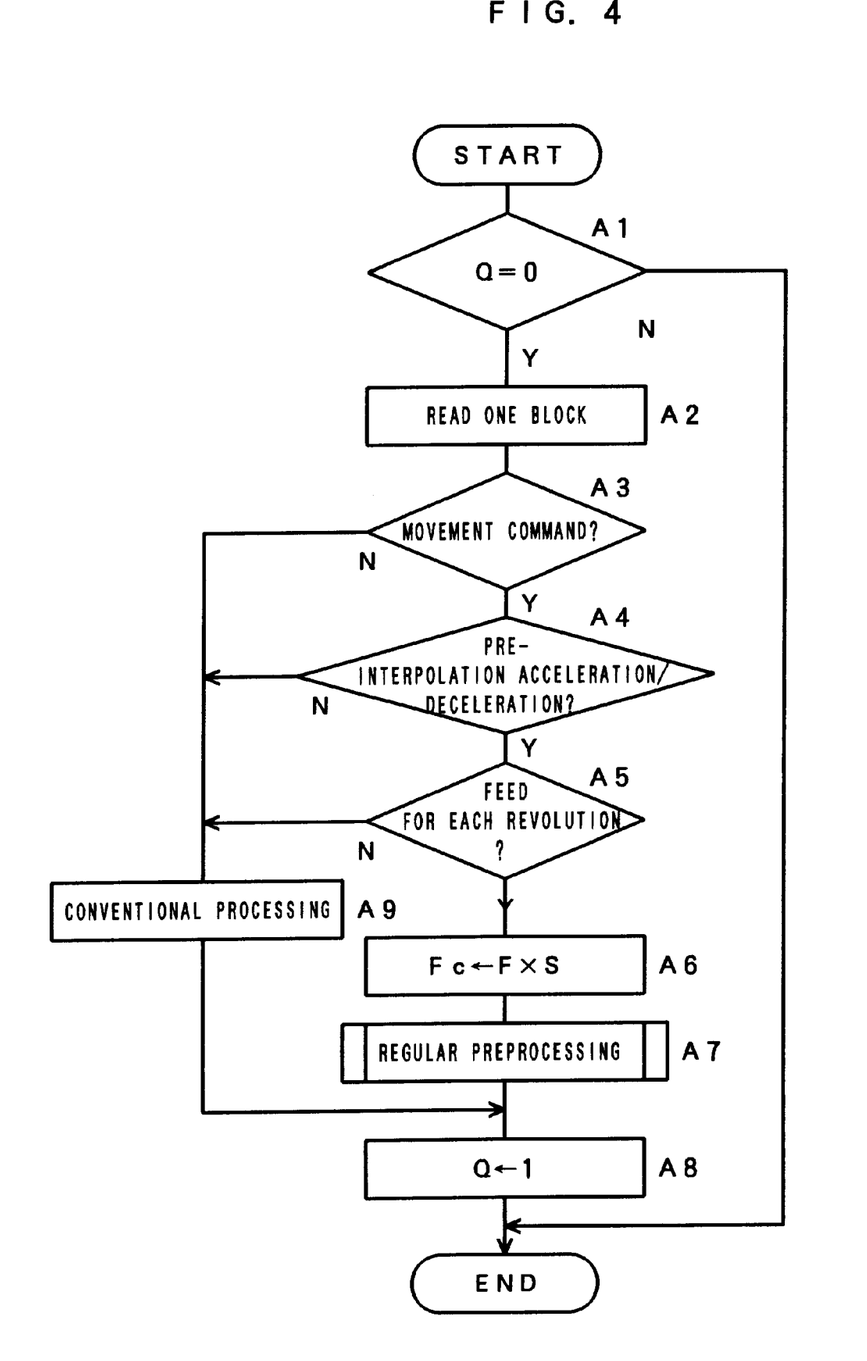
FIG. 4 is a flow chart outlining the preprocessing performed by the numerical control device of the same embodiment.
Figure 5:
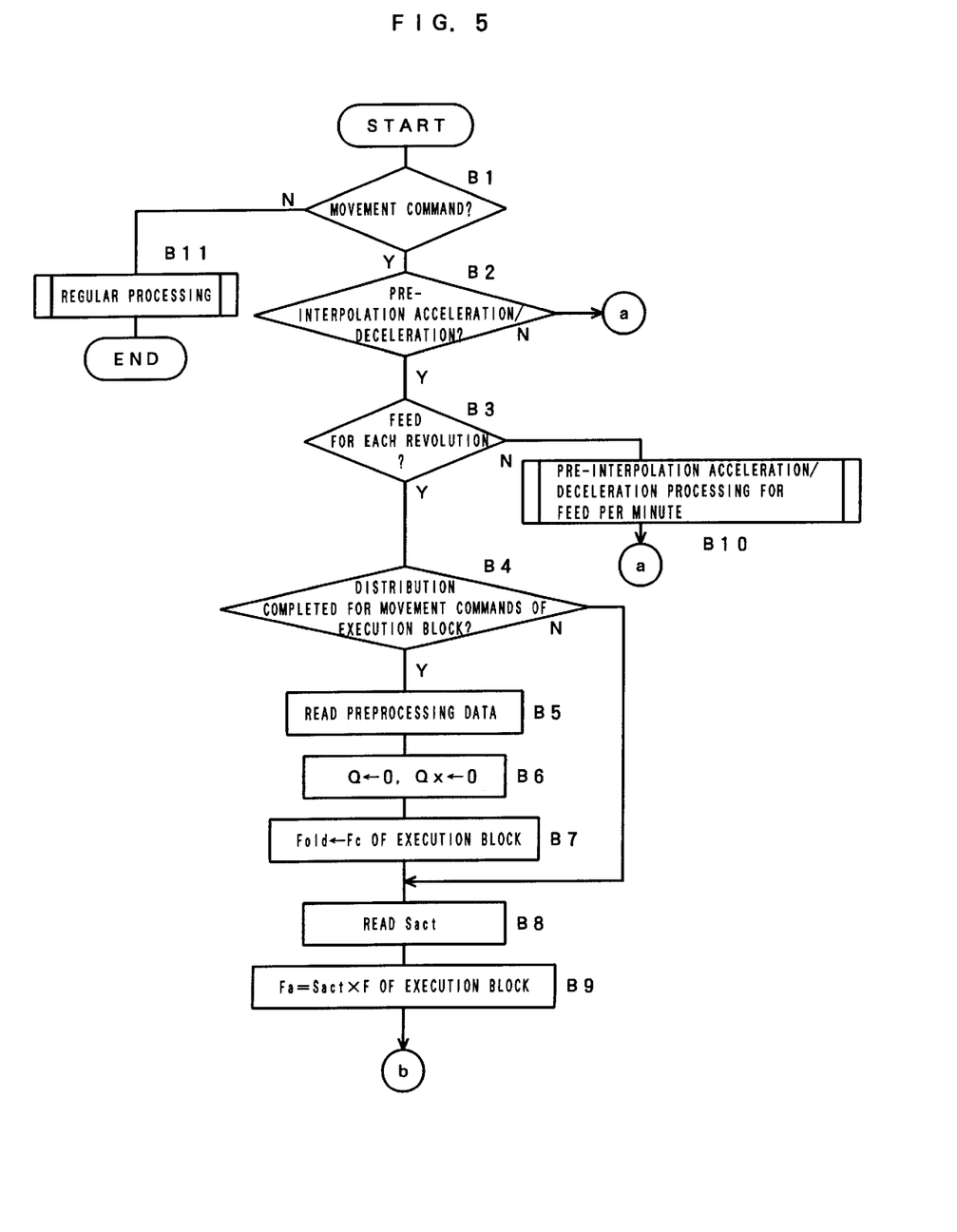
FIGS. 5 and 6 are flow charts outlining the distribution processing of movement commands performed by the numerical control device of the same embodiment.
Figure 6:
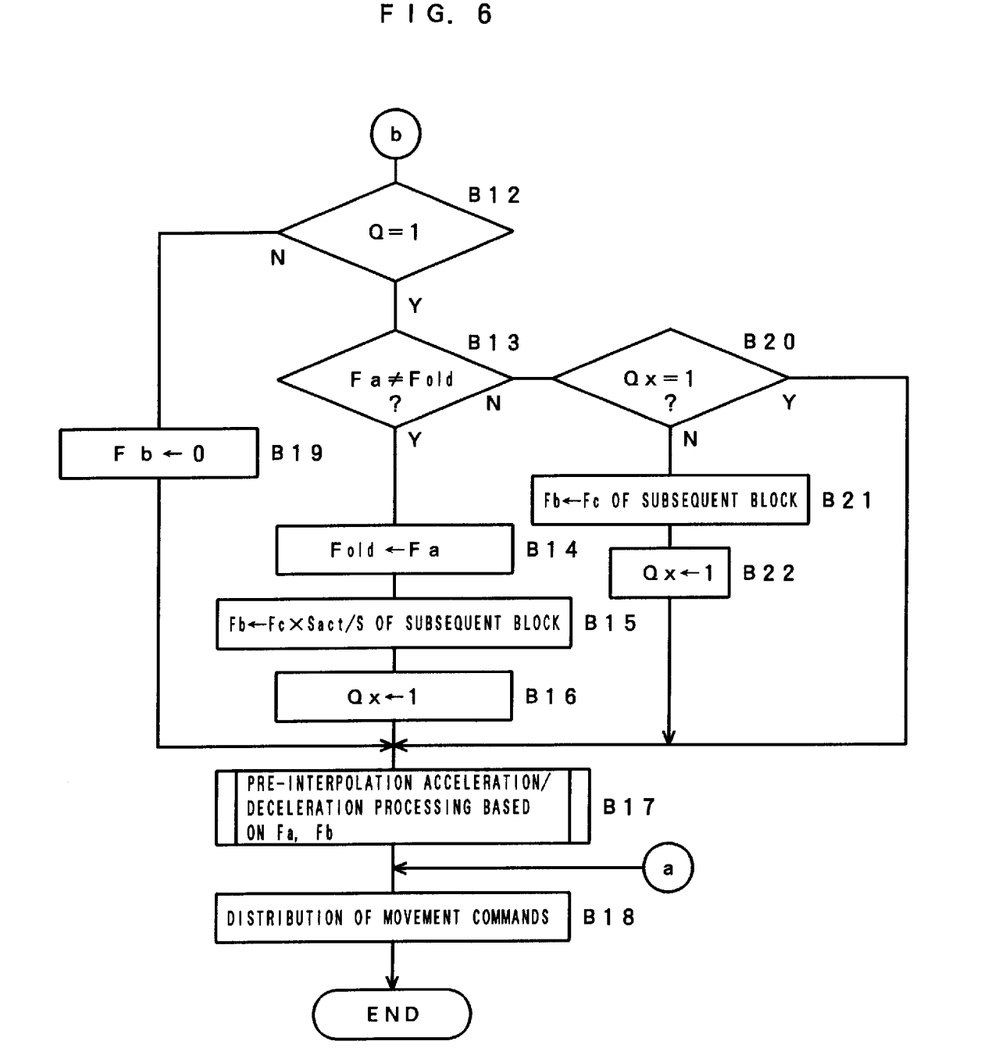

FIGS. 5 and 6 are flow charts outlining the distribution processing of movement commands iteratively executed by the processor 11 of the numerical control device 10 for each specified cycle during the execution of the machining program, and FIG. 4 is a flow chart outlining the preprocessing routine executed in the intervals of the distribution processing of the movement commands in order to compile the preprocessing data needed for the distribution processing of these movement commands.

The processing routine of the processor 11 in the present embodiment will now be described with reference to the flow charts in FIGS. 4 through 6, using the machining program in FIG. 2 as an example.

As processing is started, the processor 11 determines whether a preprocessing completion flag Q has been set (step A1) or not, and since the preprocessing completion flag Q is kept in a reset state at this stage (which immediately follows the start of the first cycle of preprocessing), the determination outcome is affirmative (Y).

In view of this, the processor 11 first reads the machining program of the first block at the front end of the machining program (step A2) and determines whether this first block is a movement command (step A3) or not.

If a machining program other than a movement command is read and the determination outcome of step A3 is negative (N), for example, in the case where block N1 in FIG. 2 is read, the processor 11 executes the conventional processing routine, starts the rotation of the spindle at 1000 (rev/min) at this time in accordance with the command for the rotational speed of this spindle (step A9), and set the preprocessing completion flag Q (step A8). The spindle already rotates at the commanded speed before the program is executed if the rotational speed of the spindle has been set by manual input.

If the block which was read at step A2 is a movement command, and the determination outcome of step A3 is affirmative (Y), the processor 11 determines whether the parameter setting of the numerical control device 10 has been designated for post-interpolation acceleration/deceleration control or pre-interpolation acceleration/deceleration control (step A4), and if the setting has been designated for post-interpolation acceleration/deceleration control, the operation is switched to the processing of step A9, the conventional preprocessing routine is executed, preprocessing data needed for the distribution processing of the movement command for this block are generated and stored in a preprocessing data storage register, and the preprocessing completion flag Q is set (step A8).

If the block which was read at step A2 is a movement command, the parameter setting of the numerical control device 10 has been designated for pre-interpolation acceleration/deceleration control, and the determination outcome of step A4 is affirmative (Y), then the processor 11 determines whether this setting corresponds to a pre-interpolation acceleration/deceleration control routine designated for a tool feed rate (feed per revolution) expressed as the amount of movement per unit rotation angle of the spindle, or to a pre-interpolation acceleration/deceleration control routine designated for a tool feed speed expressed as the amount of movement per unit time (step A5), and if the setting has been made for a pre-interpolation acceleration/deceleration control routine designated for a tool feed speed expressed as the amount of movement per unit time of the spindle, then the operation is switched to the processing of step A9, the conventional preprocessing routine is executed, preprocessing data needed for the distribution processing of the movement command for this block are generated and stored in a preprocessing data storage register, and the preprocessing completion flag Q is set (step A8).

Meanwhile, the operation is switched to step A6 if all the determination outcomes of step A3, step A4, and step A5 are affirmative (Y), that is, if the block reading at step A2 is a movement command pertaining to tool feed and if the selected pre-interpolation acceleration/deceleration control routine is designated for a tool feed rate (feed per revolution) expressed as the amount of movement per unit rotation angle of the spindle. Since the rotational speed of the spindle is unknown, which may be set by a program or by hand, and can be varied using an override function, the processor 11 uses a constant S for the maximum rotational speed of the spindle, and multiplies this constant S by a tool feed rate F (mm/rev) expressed as the amount of movement per unit rotation angle of the spindle designated for the block read by the processing of step A2, so that a tool feed speed Fc expressed as the amount of movement per unit time in this block is tentatively calculated and is stored as part of preprocessing data in the preprocessing data storage register together with the tool feed rate F (mm/rev), which is expressed as the amount of movement per unit rotation angle of the spindle (step A6).

Assuming, for example, that the constant S for the maximum rotational speed of the spindle is 10,000 (rev/min), we obtain Fc=2.00 (mm/rev)×10,000 (rev/min)=20,000 (mm/min) when block N2 in FIG. 2 has been read, so the tool feed speed Fc expressed as the amount of movement per unit time of this block will be 20,000 (mm/min).

The processor 11 subsequently executes the conventional preprocessing routine for this block, generates preprocessing data needed for the distribution of the movement command, and stores these data in a preprocessing data storage register together with the tool feed rate F (mm/rev), which is expressed as the amount of movement per unit rotation angle of the spindle, and with the tool feed speed Fc (mm/min), which is expressed as the amount of movement per unit time (step A7); and the preprocessing completion flag Q is set (step A8), completing preprocessing for this cycle.

Meanwhile, to process the distribution cycles of movement commands (pulses), the processor 11 first determines (step B1) whether the commands of the relevant block are movement commands or not, and proceeds to step B11 and performs regular processing if these commands are not movement commands. In the program shown in FIG. 2, a spindle for which a value of 1000 (rev/min) has been outputted rotates at this speed in step B11 because the initially read block N1 is not a movement command but a command designating the rotational speed of the spindle. The preprocessing completion flag Q is reset as the data for executing the commands for the rotational speed of the spindle is read, completing the processing of this distribution cycle.

Meanwhile, when determined at step B1 that the commands are movement commands, then it is determined whether the parameter setting of the numerical control device 10 has been designated for post-interpolation acceleration/deceleration control or pre-interpolation acceleration/deceleration control (step B2), and if the setting has been designated for post-interpolation acceleration/deceleration control, then the distribution processing of the movement commands is performed for this cycle in the conventional manner, based on the preprocessing data generated by the aforementioned preprocessing during step A9 (step B18), and the distribution processing of the movement command for this cycle is completed. In this respect, the described routine is the same as the conventional routine.

In addition, if the parameter setting of the numerical control device 10 has been designated for pre-interpolation acceleration/deceleration control and the determination outcome of step B2 is affirmative (Y), then the processor 11 further determines whether this setting corresponds to a pre-interpolation acceleration/deceleration control routine designated for a tool feed rate (feed per revolution), which is expressed as the amount of movement per unit rotation angle of the spindle, or to a pre-interpolation acceleration/deceleration control routine designated for a tool feed speed, which is expressed as the amount of movement per unit time (step B3), and if the setting has been designated for a pre-interpolation acceleration/deceleration control routine designated for a tool feed speed expressed as the amount of movement per unit time (that is, if the determination outcome in step B3 is negative (N)), then the pre-interpolation acceleration/deceleration control for the amount of movement per unit time is performed in the conventional manner, based on the preprocessing data generated by the aforementioned preprocessing during step A9 (Step B10), and the distribution processing of the movement command for this cycle is performed based on the results (step B18), completing the distribution processing of the movement commands for this cycle. In this respect, the described routine is the same as the conventional routine.

Meanwhile, the processor 11 first determines whether the distribution processing or other processing of the movement commands for the currently executed block has been completed or not (step B4) when the determination outcomes of both step B2 and step B3 are affirmative (Y), that is, when the parameter setting of the numerical control device 10 has been designated for pre-interpolation acceleration/deceleration control, and this setting corresponds to a pre-interpolation acceleration/deceleration control routine designated for a tool feed rate (feed per revolution) expressed as the amount of movement per unit rotation angle of the spindle.

At the stage immediately following the start of distribution processing of the first movement command, the data stored in the preprocessing data storage register by the above-described preprocessing routine are not yet transmitted to the data storage register for execution. Consequently, the data storage register for execution is empty, and the determination outcome of step B4 is affirmative (Y) in the same manner as when the distribution processing of the movement command for the currently executed block is completed.

In view of this, the processor 11 first reads the preprocessing data generated by the preprocessing of the above-described step A6 and step A7 from the preprocessing data storage register and enters these data, as a block to be executed, into the data storage register for execution (step B5); resets the preprocessing completion flag Q and the flag Qx for indicating completion of the setting of the target value for the acceleration/deceleration; allows the execution of the preprocessing for the subsequent block (step B6); and reads the tool feed speed Fc (mm/min) corresponding to the block being executed at this stage, which is expressed as the amount of movement per unit time, from the data storage register for execution, and stores this read data as the initial value in a feed speed storage register Fold (step B7).

It is apparent that the initial value of the feed speed storage register Fold in the program example in FIG. 2 is 20,000 (mm/min) because the preprocessing data of block N2, (which constitutes the initial movement command) in the case of the program shown in FIG. 2, are entered first of all into the data storage register for execution.

The processor 11 subsequently reads the current value Sact (rev/min) of the rotational speed, which represents the substantial angular speed of the spindle motor 62, from the position and speed sensor of the spindle motor 62 (step B8); the tool feed rate F (mm/rev), which is expressed as the amount of movement per unit rotation angle of the spindle commanded for the block being executed, is read from the data storage register for execution; these two values are multiplied to calculate a tool feed speed Fa (mm/min) expressed as the amount of movement per unit time designated for the block being executed; and the result is stored in an ideal feed speed storage register Fa (step B9).

For example, the Fa value is 2.00 (mm/rev)×Sact (rev/min) in a state in which the preprocessing data of block N2, which is the initial movement command in FIG. 2, are entered into the data storage register for execution. Naturally, Fa=2000 (mm/min) if the current value Sact of the rotational speed of the spindle motor 62 is the same as 1000 (rev/min) designated by block N1.

The processor 11 subsequently determines (step B12) whether the preprocessing completion flag Q has been set or not. The determination outcome of step B12 is negative (N) at the current stage immediately after transfer of the preprocessing data of the initial movement command to the data storage register for execution from the preprocessing data storage register because preprocessing for the subsequent block has not yet been executed and the value of the flag Q, which has been reset by the processing at step B6, is preserved unchanged.

In view of this, the processor 11 assigns a tentative value of 0 (mm/min) to a second ideal feed speed storage register Fb for storing the ideal feed speed designated for the subsequent block (step B19); executes the conventional pre-interpolation acceleration/deceleration control routine for the acceleration/deceleration control of the tool feed speed, which is expressed as the amount of movement per unit time, on the basis of the tool feed speed Fa (mm/min), expressed as the ideal amount of movement per unit time for the currently executed block and the tool feed speed Fb for the subsequent block (mm/min) expressed as the ideal amount of movement per unit time (step B17); and executes distribution processing for the movement commands of the respective cycle on the basis of these results (step B18), completing distribution processing for the movement command of this cycle.

As has already been described above, Fa=2000 (mm/min) when the current value Sact of the rotational speed, which represents the substantial angular speed of the spindle motor 62, matches the value 1000 (rev/min) designated by block N1. In addition, the tool feed speed, which is expressed as the current amount of movement per unit time, is 0 (mm/min) at the stage immediately after the start of distribution processing of the movement command for the block N2 being executed, and there is no need to take into account the feed speed of the subsequent block N3 for a stage at which the remaining movement distance of the block N2 being executed is sufficiently large, with the result that the tool feed speed is raised to 2000 (mm/min) by the conventional pre-interpolation acceleration/deceleration control, as shown by the section P-O in FIG. 3, and the tool is subsequently caused to feed at a speed of 2000 (mm/min), as shown by the section O-A in FIG. 3. The processing routine to be performed when the current value Sact of the rotational speed of the spindle is lower than the designated speed of 1000 (rev/min) will be described below.

As described above, when the determination outcome of step B12 is negative (N), that is, at the stage immediately after preprocessing data have been transferred from the preprocessing data storage register to the data storage register for execution, and then a new distribution of movement commands has been started for the block being executed, 0 (mm/min) is automatically set by the processing of step B19 as the value of the tool feed speed Fb expressed as the ideal amount of movement per unit time for the subsequent block. These are substitute processing routines to be done on the ground that the preprocessing data for the subsequent block have not been generated and the true value of the tool feed speed Fb expressed as the ideal amount of movement per unit time for the subsequent block has not been obtained. The value of the tool feed speed Fb for a case in which the determination outcome of step B12 is negative (N) is not important at a stage at which a new block to be executed has insufficient remaining movement distance, and also this type of processing (step B19) is necessary for executing the final movement command and stopping the feed.

The contents of the preprocessing data storage register are transferred, by the processing of step B5 and step B6 during the distribution processing of movement commands, to the data storage register for execution, and the preprocessing completion flag Q is reset, with the result that preprocessing for the subsequent block (that is, reusing the preprocessing data storage register) is allowed, an affirmative (Y) determination outcome is obtained for step A1 during the subsequent preprocessing cycle, and the processing of FIG. 4 is performed in the same manner as described above.

In the program example shown in FIG. 2, block N3, which is a second movement command, is read by the processing of step A2; and determinations at step A3, step A4, and step A5 yield affirmative (Y) outcomes on the basis of the parameter settings on the side of the numerical control device 10. The processor 11, referring to the tool feed rate F (mm/rev) commanded for block N3, expressed as the amount of movement per unit rotation angle of the spindle, multiplies this value by the constant S (rev/min) for the maximum rotational speed of the spindle, calculates the tool feed speed Fc (mm/min) corresponding to the present block, expressed as the amount of movement per unit time, and stores the result as part of preprocessing data in the preprocessing data storage register together with the tool feed rate F (mm/rev), which is expressed as the amount of movement per unit rotation angle of the spindle (step A6).

If block N3 in FIG. 2 is read, then Fc=1.00 (mm/rev)×10,000 (rev/min) =10,000 (mm/min), and the tool feed speed Fc expressed as the amount of movement per unit time for this block will be 10,000 (mm/min).

The processor 11 then performs the conventional preprocessing for this block; generates the preprocessing data needed for the division of movement commands; updates the data in the preprocessing data storage register by storing the results together with the tool feed rate F (mm/rev) expressed as the amount of movement per unit rotation angle of the spindle, and the tool feed speed Fc (mm/min) expressed as the amount of movement per unit time (step A7); and sets the preprocessing completion flag Q (step A8), completing the preprocessing for this cycle.

Meanwhile, determinations at step B1, step B2, and step B3 yield affirmative (Y) outcomes on the basis of the parameter setting on the side of the numerical control device 10 in the same manner as above during the processing of distribution cycles for the movement commands, and the processor 11 determines whether the distribution processing of the movement commands for the block being executed (in this example, the distribution processing of the movement commands for the block N2 currently stored in the data storage register for execution) has been completed or not (step B4).

If the distribution processing of movement commands has not been completed, then the subsequent block (that is, block N3 of the preprocessing data) stored in the preprocessing data storage register cannot be transferred to the data storage register for execution, so that the processor 11 skips processing of step B5, step B6 and step B7. Consequently, the preprocessing completion flag Q is kept unchanged in the set state, and further execution of preprocessing for the subsequent block N4 (not shown in FIG. 2) is prohibited.

The processor 11 subsequently reads the current value Sact (rev/min) of the rotational speed, which represents the substantial angular speed of the spindle motor 62, from the position and speed sensor of the spindle motor 62 (step B8); reads the tool feed rate F (mm/rev), which represents the amount of movement per unit rotation angle of the spindle commanded for the block N2 as an object of execution, from the data storage register for execution; multiplies these two values to obtain a tool feed speed Fa (mm/min) designated for the block to be executed, expressed as the amount of movement per unit time; and updates the contents of the ideal feed speed storage register Fa by storing the result in it (step B9).

The Fa value is 2.00 (mm/rev)×Sact (rev/min) in the current state in which the preprocessing data of block N2 are entered into the data storage register for execution. If the current value Sact of the rotational speed, which represents the substantial angular speed of the spindle motor 62, is the same as 1000 (rev/min) designated by block N1, then, Fa=2000 (mm/min) and this value is different from the tool feed speed Fc (20,000 (mm/min)) corresponding to the block being executed, which is expressed as the amount of movement per unit time.

The processor 11 subsequently determines whether the preprocessing completion flag Q has been set to 1 or not (step B12), and processes the aforementioned steps of B19, B17, and B18 if flag Q has not be set (that is, if the determination outcome is negative (N)), completing processing for the distribution cycles of the corresponding movement commands. Processings of steps B1–B4, B8, B9, B12, B19, B17, and B18 are then executed for each distribution cycle of movement commands until the flag Q is set.

Determination at step B12 yields an affirmative (Y) outcome once preprocessing has been completed as described above and flag Q has been set. This means that the preprocessing data for the block targeted for current execution are stored in the data storage register for execution, and the preprocessing data for the block targeted for subsequent execution are stored in the preprocessing data storage register. In other words, it is possible to calculate correct values for the ideal tool feed speed Fb expressed as the amount of movement per unit time and designated for the block targeted for subsequent execution.

In view of this, the processor 11 determines whether the tool feed speed Fa (mm/min) designated for the block targeted for current execution, expressed as the amount of movement per unit time, matches the tool feed speed Fold (mm/min) which has been stored in the feed speed storage register Fold up to now, expressed as the amount of movement per unit time (step B13).

Determining whether or not Fa=Fold at step B13 is essentially the same as finding whether the speed of the spindle has changed or not, but it also involves determining as to whether the speed of the spindle axis at the initial phase of movement in a block is different from the maximum speed of the spindle or not. Specifically, the tool feed speed Fa is given as F×Sact at step B9, the tool feed speed Fold is set to Fc at step B7, and this Fc is assumed to be F×S at step A6, so that determining as to whether or not Fa=Fold is the same as determining as to whether F×Sact=F×S, meaning ascertaining that Sact=S and also meaning of determination as to whether the actual speed of the spindle matches the maximum rotational speed.

When the tool feed speed Fa (mm/min) for the block targeted for current execution does not coincide with the tool feed speed Fold (mm/min) as it has been up to now, expressed as the amount of movement per unit time (in the above example, initially Fa=2000 (mm/min), which is different from Fold =Fc=2.00 (mm/min)×10,000 (rev/min)=20,000 (mm/min)), so that determination at step B13 yields affirmative (Y) outcome, the processor 11 stores the tool feed speed Fa for the block targeted for current execution, expressed as the amount of movement per unit time, in the feed speed storage register Fold to update the tool feed speed Fc calculated by preprocessing for block N2, (step B14).

The processor 11 reads the value of the tool feed speed Fc (mm/min) obtained by a preprocessing routine corresponding to the block N3 targeted for subsequent execution, expressed as the amount of movement per unit time from the preprocessing data storage register; multiplies this value by Sact (rev/min)/S (rev/min); calculates the estimated value Fb (mm/min) of the tool feed speed for the subsequent block when the rotational speed of the spindle for the subsequent block is kept at the current value Sact of the rotational speed of the spindle; and stores this value as an update in the second ideal feed speed storage register Fb (step B15). In this case, the estimated value Fb of the tool feed speed is 10,000 (mm/min)×1000 (rev/min)/10,000 (rev/min), or 1000 (mm/min). The estimated value Fb of the tool feed speed for the subsequent block N3 can thus be obtained in accordance with the current speed Sact of the spindle.

The flag Qx for indicating completion of the setting of the target value for the acceleration/deceleration is set (step B16), and pre-interpolation acceleration/deceleration processing is performed on the basis of the second ideal feed speed storage register Fb for which the tool feed speed Fa has been freshly calculated (step B17). In this case as well, when the amount of movement remaining in block N2 is sufficient, the feed speed of the subsequent block (the speed stored in the second ideal feed speed storage register Fb) is unrelated to acceleration/deceleration processing, and the acceleration/deceleration processing is performed based on the current feed speed and on the feed speed Fa calculated at step B9. Movement commands, which are the results of the acceleration/deceleration processing, are distributed, and the processing of the present distributed cycles is completed (step B18).

Figure 3:
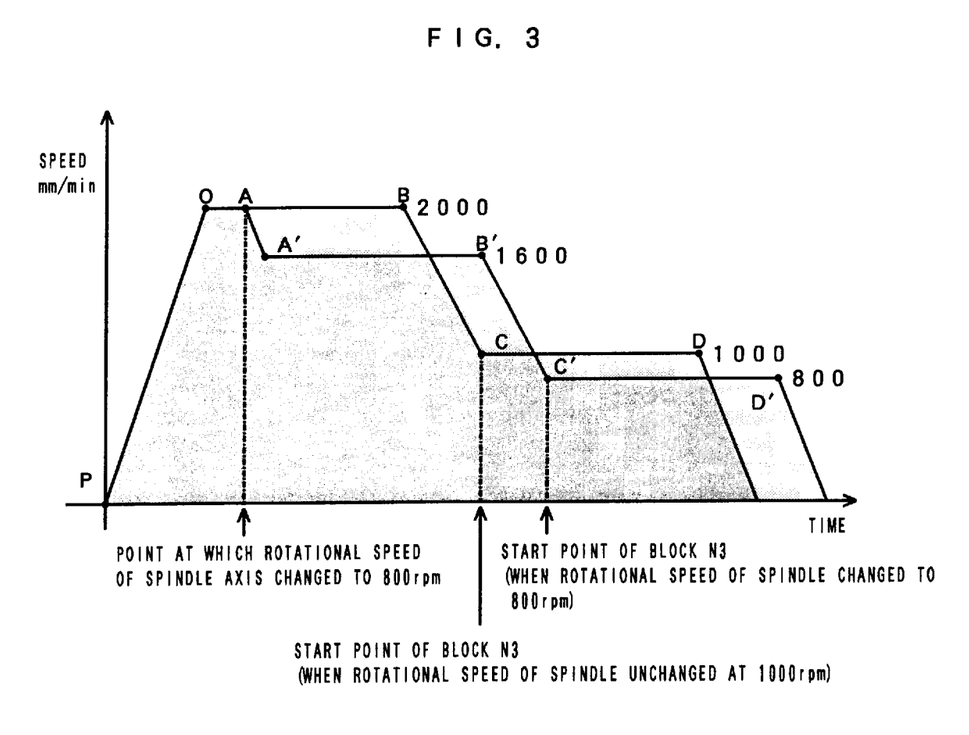
FIG. 3 is a line diagram depicting an example of operational results based on the pre-interpolation acceleration/deceleration control of the present embodiment for a case in which the rotational speed of the spindle is kept constant during the execution of the machining program, and for a case in which the rotational speed of the spindle is varied during the execution of the machining program.

If the current value Sact of the rotational speed of the spindle does not vary when the distribution processing of movement commands for block N2, designated for current execution is subsequently performed, then the processor 11 iteratively processes processings of steps B1–B4, step B8, step B9, step B12, step B13, step B20, step B17 and step B18, through the distribution processing of movement commands for each designated cycle in such a way that the tool is caused to feed with acceleration in the section P-O, as shown in FIG. 3, and, once the tool has reached the target speed of 2000 (mm/min), the tool is caused to feed at the target speed of 2000 (mm/min) in the section O-B.

Processings of steps B1–B4, B8, B9, B12, B13, B20, B17, and B18 are then iteratively executed for each distribution cycle as long as the rotational speed does not change, and, as the remaining amount of movement in the present block N2 decreases, acceleration/deceleration processing is performed based on the feed speed of the block stored in the registers Fa and Fb and on the feed speed of the subsequent block, causing the feed speed to decrease in the section B-C, as shown in FIG. 3.

When the distribution of movement commands is completed for block N2 (which is the block being executed) and determination at step B4 yields an affirmative (Y) outcome, the processor 11 performs an operation whereby the preprocessing data of block N3 stored in the preprocessing data storage register are entered into the data storage register for execution to form a block targeted for execution (step B5); the preprocessing completion flag Q and the flag Qx for indicating completion of the setting of the target value for the acceleration/deceleration are reset to allow preprocessing to be executed for the subsequent block N4 (not shown in FIG. 2) (step B6); the Fc value calculated in step A6 and stored in the executed block is stored as the initial value in the feed speed storage register Fold; and the distribution processing of movement commands for block N3 is then started in the same manner as in the case of block N2.

The preprocessing and the distribution processing of movement commands performed during this period are related to each other in the same manner as in the example described above. Specifically, preprocessing for the subsequent block N4 (not shown in FIG. 2) is performed immediately after the distribution processing of movement commands for block N3 has been started, and the resulting preprocessing data are stored in the preprocessing data storage register as updated information.

In general terms, deceleration by an acceleration/deceleration processing is completed (as shown in the section B-C in FIG. 3) and the feed speed specified for block N3 reaches 1000 (rev/min) at a stage at which the distribution of movement command for block N2 is completed, and when the current value Sact of the rotational speed of the spindle remains unchanged at 1000 (rev/min), the tool feed speed of block N3 assumes the state shown in the section C-D in FIG. 3.

Following is a description of a case in which the rotational speed of the spindle itself is caused to vary under the effect of cutting resistance or the like or as a result of an override or other outside operation, resulting in a change in the current value Sact of the rotational speed of the spindle.

Although the current value Sact of the rotational speed of the spindle sometimes exceeds the set value, the processing routine is the same irrespective of whether the rotational speed of the spindle has increased or decreased. Consequently, the example described herein refers to a case in which the rotational speed Sact of the spindle has dropped from 1000 (rev/min) to 800 (rev/min) at time A in FIG. 3 during the execution of the program in FIG. 2. Processing in the section O-A, which precedes the change in the rotational speed of the spindle, is identical to the above-described distribution processing of movement commands for block N2.

When the rotational speed Sact of the spindle changes during the iterative execution of the distribution processing of the movement commands for block N2, the processor 11 first detects the current value Sact (rev/min) of the rotational speed of the spindle by the processing of step B8; reads the tool feed rate F (mm/rev) set for the block N2 being executed, expressed as the amount of movement per unit rotation angle of the spindle, from the data storage register for execution; multiplies these values (F×Sact) to obtain the tool feed speed Fa (mm/min) for the block N2 being executed, expressed as the amount of movement per unit time; and stores the result in the ideal feed speed storage register Fa (step B9).

Because the tool feed speed F corresponding to block N2 is 2.00 (mm/rev), the value of the tool feed speed Fa for block N2 (as an object of execution) expressed as the amount of movement per unit time, is 2.00 (mm/rev)×800 (rev/min)=1600 (mm/min) when the rotational rate Sact of the spindle has changed from 1000 (rev/min) to 800 (rev/min), as at time A in FIG. 3.

In addition, it is apparent that determination at step B12 yields an affirmative (Y) outcome at time A in FIG. 3 because preprocessing for the subsequent block N3 is already completed, preprocessing data for block N3 are stored in the preprocessing data storage register, and the preprocessing completion flag Q is set.

Consequently, the processor 11 determines (step B13) whether or not there is a match between the tool feed speed Fa (mm/min) designated for the currently executed block, expressed as the amount of movement per unit time, and the tool feed speed stored in the feed speed storage register Fold, expressed as the amount of movement per unit time. In this case, it is apparent that determination at step B13 yields an affirmative outcome because the value Fa is 1600 (mm/min), while the value Fold is 2000 (mm/min), being different from each other.

In view of this, the processor 11 first stores the value of the tool feed speed Fa designated for the currently executed block, expressed as the amount of movement per unit time, as an update in the feed speed storage register Fold (step B14). This is because the feed speed Fa=1600 (mm/min) is applied based on the distribution processing of the movement commands for this cycle, and because the current value of the feed speed Fa serves as a comparison object for detecting the presence or absence of changes in the feed speed when the feed speed is detected for changes during the distribution processing of subsequent movement commands (step B13).

It is also apparent that a change in the current value Sact of the rotational speed of the spindle leads to changes in the tool feed speed Fb for the subsequent block.

In view of this, the processor 11 reads the value of the tool feed speed Fc (mm/min) obtained by a preprocessing routine corresponding to the block N3 targeted for subsequent execution, expressed as the amount of movement per unit time, from the preprocessing data storage register; multiplies this value by Sact (rev/min)/S (rev/min); obtains the estimated value Fb (mm/min) of the tool feed speed for the subsequent block when the rotational speed of the spindle for the subsequent block is kept at the current value Sact of the rotational speed of the spindle; and stores this value as an update in the second ideal feed speed storage register Fb (step B15). In this case, the estimated value Fb of the tool feed speed is 10,000 (mm/min)×800 (rev/min)/10,000 (rev/min), or 800 (mm/min).

At this stage, therefore, the tool feed speed Fa (mm/min) for the currently executed block N2 is corrected to compensate for the change in the rotational speed of the spindle from 1000 (rev/min) to 800 (rev/min), and also the tool feed speed Fb (mm/min) of the block N3 targeted for subsequent execution, that is, the target value Fb (mm/min) of the current pre-interpolation acceleration/deceleration control routine, is corrected.

The processor 11 subsequently executes the conventional pre-interpolation acceleration/deceleration control routine by using acceleration/deceleration control for the tool feed speed, expressed as the amount of movement per unit time, on the basis of the ideal tool feed speed Fa (mm/min) for the currently executed block N2, expressed as the ideal amount of movement per unit time, and the ideal tool feed speed Fb (mm/min) for the subsequent block N3, expressed as the ideal amount of movement per unit time (Step B17); and executes distribution processing for the movement commands of the respective cycle on the basis of these results (step B18), completing distribution processing for the movement commands of this cycle.

It is apparent that the value of the ideal tool feed speed Fa (mm/min) for the currently executed block N2, expressed as the amount of movement per unit time, is 1600 (mm/min), and that the value of the ideal tool feed speed Fb (mm/min) for the subsequent block N3, expressed as the amount of movement per unit time, is 800 (mm/min).

When the amount of movement remaining in currently executed block N2 is sufficient, the feed speed of the subsequent block does not have any bearing on the process; the conventional acceleration/deceleration processing is performed based on the current feed speed and on the feed speed Fa calculated during the corresponding cycle; and, based on the distribution processing of the movement commands, the feed speed of the currently executed block N2 is lowered from 2000 (mm/min) to 1600 (mm/min) at point A' in FIG. 3.

If the current value Sact of the rotational speed of the spindle does not vary when the distribution processing of movement commands for block N2, which is a block designated for current execution, is subsequently performed, then the processor 11 iteratively performs processings of steps B1–B4, step B8, step B9, step B12, step B13, step B20, step B17, and step B18, through the distribution processing of movement commands for each designated cycle; and the tool is caused to feed at a speed of 1600 (mm/min), as shown in the section A'-B' in FIG. 3.

In addition, the acceleration/deceleration control between B' and C', which is the same pre-interpolation acceleration/deceleration control as that used for the acceleration/deceleration control of the tool feed speed expressed as the amount of movement per unit time, is automatically controlled by the aforementioned step B17 on the basis of the ideal tool feed speed Fa=1600 (mm/min) for the block being executed, expressed as the amount of movement per unit time, and the ideal tool feed speed Fb=800 (mm/min) for the subsequent block, expressed as the ideal amount of movement per unit time.

When the distribution of movement commands for block N2 being executed is completed and determination at step B4 yields an affirmative (Y) outcome, the processor 11 reads the preprocessing data of block N3 stored in the preprocessing data storage register and store the data into the data storage register for execution to form a block targeted for execution (step B5); resets the preprocessing completion flag Q and the flag Qx for indicating completion of the setting of the target value for the acceleration/deceleration to allow execution of preprocessing for the subsequent block N4 (not shown in FIG. 2) and also writing of new preprocessing data to the preprocessing data storage register (step B5); and starts the distribution processing of movement commands for block N3 in the same manner as in the case of block N2 above.

The preprocessing and the distribution processing of movement commands performed during this period are related to each other in the same manner as in the example described above. Specifically, preprocessing for the subsequent block N4 (not shown in FIG. 2) is executed by a preprocessing routine performed immediately after the start of the distribution processing of movement commands for block N3, and the preprocessing data are stored in the preprocessing data storage register as updated information. In general terms, section C'-D' in FIG. 3 shows the state of the tool feed speed for block N3 when the current value Sact of the rotational speed for the spindle remains unchanged at 800 (rev/min).

Although the tool feed speed Fc=10,000 (mm/min) obtained by the preprocessing routine corresponding to block N3 is temporarily stored in the feed speed storage register Fold (see step B7) at a stage at which the distribution processing of movement commands for block N3 is started, the actual tool feed speed Fa for block N3 is the value calculated by the processing of step B8 and step B9 on the basis of the current value Sact of the rotational speed of the spindle, that is, 1.00 (mm/rev)×800 (rev/min)=800 (mm/min).

Because the preprocessing completion flag Q is reset at this stage (see step B12), the processor 11 enters a provisional value of 0 (mm/min) into the second ideal feed speed storage register Fb which stores the ideal feed speed for the subsequent block N4 (see step B19); and performs the conventional pre-interpolation acceleration/deceleration control routine to be used for an acceleration/deceleration control of the tool feed speed expressed as the amount of movement per unit time, on the basis of the ideal tool feed speed Fa (mm/min) for the currently executed block, expressed as the ideal amount of movement per unit time, and the ideal tool feed speed Fb (mm/min) for the subsequent block, expressed as the amount of movement per unit time.

As described above, when the determination outcome of step B12 is negative (N), that is, immediately after the start of the distribution of new movement commands, 0 (mm/min) is automatically set by the processing of step B19 as the value of the ideal tool feed speed Fb for the subsequent block, expressed as the amount of movement per unit time. The value of the tool feed speed Fb for a case in which the determination outcome of step B12 is negative (N) is not important at a stage at which a new block to be executed has insufficient remaining movement distance, allowing the Fa value (that is, 800 (mm/min)) obtained by the processing of step B8 and step B9 to be used as the actual tool feed speed (see step B17).

In the processing of step B13 in the distribution processing of movement commands executed following completion of preprocessing for the subsequent block N4 (not shown in FIG. 2) and setting of the preprocessing completion flag Q, the Fa value of 800 (mm/min) and the Fold value of 10,000 (mm/min) do not coincide with each other so that determination outcome of step 13 is yielded affirmative (Y), with the result that the Fold value can be immediately substituted with the Fa value of 800 (mm/min) (see step B14). Because at this stage the Fb value of the tool feed speed for block N4 (not shown in FIG. 2), which is a block targeted for subsequent execution, is obtained using the arithmetic expression Fc×Sact/S for block N4 (see step B15), in the distribution processing of subsequent movement commands, pre-interpolation acceleration/deceleration control on the basis of the tool feed speed Fa=800 (mm/min) for the block N3 being executed, and the tool feed speed Fb designated for the subsequently executed block N4, calculated based on the substantial rotational speed Sact of the spindle for the block N3 being executed (see step B17).

Consequently, appropriate pre-interpolation acceleration/deceleration control can be performed without causing any obstacles during the switching of execution blocks even when the program contains several blocks of movement commands for tool feed, and further appropriate pre-interpolation acceleration/deceleration control can be achieved even when the substantial rotational speed Sact of the spindle changes several times within a single block of movement commands or when the rotational speed Sact of the spindle is switched repeatedly.

Although description of the processings at steps B21 and B22 were omitted, these processings at steps B21 and B22 are such that when the preprocessing data of a single block are read and the corresponding actual rotational speed Sact of the spindle is found to be the maximum rotational speed S of the spindle, the results are Sact=S, Fold=S×F, and Fa=Sact×F, so that Fold=Fa, with the result that determination at step B13 yields a negative (N) outcome and processings proceeds to step B20, and the flag Qx at step B6 is reset at the start of the distribution processing of one-block movement commands, with the result that the processing proceeds to step B21, an Fc value is stored for the tool feed speed Fb in the same manner as in the case of processing at step B15 (Sact/S=1), and the flag Qx is reset to 1. Subsequent processings are the same as described before.

What is claimed is:

1. An acceleration/deceleration control method for a numerical control device, which controls a tool feed speed based on a tool feed rate commanded by an amount of movement per unit rotation of a spindle, comprising:

converting a commanded tool feed rate expressed as an amount of movement per unit rotation of the spindle to a tool feed speed expressed as an amount of movement per unit time based on an actual rotational speed of the spindle to obtain a current tool feed speed;

converting a next commanded tool feed rate expressed as an amount of movement per unit rotation of the spindle to a tool feed speed expressed as an amount of movement per unit time based on the actual rotational speed of the spindle to obtain a next tool feed speed; and executing acceleration/deceleration control of the machine tool based on the current tool feed speed and the next tool feed speed.

2. A numerical control method for a numerical control device according to claim 1, further comprising:

monitoring the rotational speed of the spindle; and performing a conversion to a tool feed command expressed as the amount of tool movement per unit time again in response to detecting a change in the rotational speed of the spindle.

3. A numerical control device for controlling a tool feed speed on the basis of a tool feed rate commanded by an amount of movement per unit rotational of a spindle, comprising:

means for sensing an actual feed speed of the spindle;

command conversion means for converting a current commanded tool feed rate expressed as an amount of movement per unit rotation of the spindle to a tool feed speed expressed as an amount of tool movement per unit time based on an actual rotational speed of the spindle to obtain a current tool feed speed and for converting a subsequent command tool feed rate expressed as an amount of movement per unit rotation of the spindle to a tool feed speed expressed as an amount of tool movement per unit time based on the actual rotational speed of the spindle to obtain a subsequent tool feed speed; and means for performing acceleration/deceleration control on the basis of the current tool feed speed and the subsequent tool feed speed converted by said command conversion means.

* * * * *

UNITED STATES PATENT AND TRADEMARK OFFICE
CERTIFICATE OF CORRECTION

PATENT NO. : 6,225,772 B1
DATED : May 1, 2001
INVENTOR(S) : Nobuaki Aizawa et al.

It is certified that error appears in the above-identified patent and that said Letters Patent is hereby corrected as shown below:

Title page,
Item [75], delete "-gun"

Column 2,
Line 2, change "speed" to -- rate -- (second occurrence)

Column 12,
Line 41, change "speed" to -- rate --.

Signed and Sealed this

Eighth Day of January, 2002

*Attest:*

*Attesting Officer*

JAMES E. ROGAN
*Director of the United States Patent and Trademark Office*